United States Patent [19]

Rosinski, III

[11] Patent Number: 5,199,743
[45] Date of Patent: Apr. 6, 1993

[54] DISK CARRIER

[75] Inventor: Alexander B. Rosinski, III, North Chelmsford, Mass.

[73] Assignee: Digital Equipment Corporation, Maynard, Mass.

[21] Appl. No.: 834,013

[22] Filed: Feb. 10, 1992

[51] Int. Cl.⁵ .............................................. B42D 15/00
[52] U.S. Cl. ...................................... 281/45; 281/38; 281/15.1; 281/31; 402/79
[58] Field of Search ............... 281/15.1, 29, 31, 38, 281/45; 402/79, 80 R, 80 P

[56] References Cited

U.S. PATENT DOCUMENTS

D. 303,042  8/1989  Mackey .
D. 304,781 11/1989  Hanson .
D. 316,180  4/1991  Hines .
4,620,630 11/1986  Moss .
4,694,954  9/1987  Moss .
4,709,812 12/1987  Kosterka .
4,850,731  7/1989  Youngs .

OTHER PUBLICATIONS

Enclosed color photographs of samples in the possession of the Assignee. The one sheet is marked "IDS Photographs".

Primary Examiner—Paul A. Bell
Attorney, Agent, or Firm—Ronald E. Myrick; Barry N. Young; Ronald C. Hudgens

[57] ABSTRACT

A folder is described which holds and protects media, such as multiple disks, during and subsequent to shipping. An insert is provided that may be assembled with the folder and which increases the disk storage capacity of the folder assembly. A pocket is also provided to hold documentation associated with the disks.

18 Claims, 5 Drawing Sheets

DISK CARRIER

FIELD OF THE INVENTION

This invention relates to a folder for holding and protecting media, such as computer disks and the like.

BACKGROUND OF THE INVENTION

Computer software, including various types of digitally encoded information used with computers, is often bought and sold. To transfer this software to the customer, the seller typically stores the software on a media, such as compact discs or floppy disks. This media must then be packaged for sale and shipment. The software product may also include periodic updates, requiring that updates be shipped to each customer several times per year. In addition to the significant number of shipments that may be required, there is also variation among different software products and their updates. While some shipments may include only one disk, others, containing multiple or complex products, may require several disks. As existing products are enhanced, and future products are produced, an increasing number of disks are often required.

A number of package types have been used to hold media, such as compact discs. One such package, used in the software industry, is a laminated thermoformed binder, made of four layers of laminated plastic. One layer is thermal formed to create cavities that hold compact discs. This binder effectively holds and protects the discs, but, because of its materials and manufacturing process, it is relatively expensive to produce. The binder is also bulky, which reduces its suitability for software update shipping. Provisions for including full-size documentation, such as A4 size paper, are also lacking.

The music industry, which routinely ships compact discs, offers additional package types. The most common compact disc package is called a jewel box. The jewel box is a three piece assembly of molded polycarbonate and styrene. Generally, two clear pieces are hinged along a common side and a compact disc holder is snap fit into the assembly. While the jewel box protects an enclosed compact disc, it is fragile, expensive to manufacture, and lacks provisions for holding A4 or similar sized documentation.

U.S Pat. No. 4,694,954, issued on Sep. 22, 1987 to Moss, discloses a low cost compact disc enclosure as an alternative to the jewel box. It is formed from a folded and bonded blank of rigid material The enclosure does not include provisions for holding A4 or similarly sized documentation. In addition, no device or method is disclosed that would allow the compact disc storage capacity of the enclosure to be increased.

U.S. Pat. No. 4,709,812, issued on Dec. 1, 1987 to Kosterka, discloses a package for one or more compact discs only, no provision being made for documentation. The package is formed from a rectangular sheet and one or more compact disc holders. The compact disc holder itself is preferably an injection molded plastic element, similar to the compact disc holder found in the jewel box.

U.S. Pat. No. 4,850,731, issued on Jul. 25, 1989 to Youngs, discloses a storage device for a single compact disc. Also disclosed is a storage device for one or more compact discs. Both storage devices are formed from a rectangular nonwoven fabric, a backing sheet, a transparent front sheet, and a pocket forming sheet. The disclosed storage device for one or more compact discs is also securable in a binding device. To provide expanded storage, multiple storage devices must be secured in a binding device, such as a ring binder.

Accordingly, the above described devices for packaging compact discs are either expensive or limited in storage capacity. The one mentioned device with provisions for increased compact disc storage capacity requires the use of an additional binding device which increases the cost of the assembly.

Therefore, it is desirable to have an inexpensive device that can hold the media, protect the media during shipping, and provide an easily expandable media storage capacity. It is further desirable that this device be capable of holding both media and A4 or similar sized documentation.

SUMMARY OF THE INVENTION

In a broad aspect, the invention relates to a folder for holding media, such as multiple computer disks. In this regard, the folder includes one disk pocket for each disk to be held. The folder may also include a pocket to hold A4 or similarly sized documentation. The folder is suitable for both shipment and storage of the media.

In another aspect, the invention relates to an insert for holding media, such as one or more computer disks. The insert includes one disk pocket for each disk to be held in the insert, and includes one or more insert tabs. The insert is removably held in the folder by placing an insert tab, or tabs, in a corresponding disk pocket, or pockets, of the folder. Additional inserts may be assembled with the folder by placing an insert tab, or tabs, of each additional insert in a corresponding disk pocket, or pockets, of a previously assembled insert. Accordingly, the addition of inserts to a folder increases the disk storage capacity of the folder assembly. The resulting folder assembly, like the folder, is suitable for both shipment and storage of media.

As disclosed, both the folder and inserts are suitable for holding a variety of media, such as optical discs or magnetic floppy disks.

In a preferred form, the folder is constructed from a shaped blank of foldable material separated into various regions by score lines. The folder includes one disk pocket for each disk to be held. The pocket arrangement of the folder is formed between to overlaying panels, which are joined together in selected regions to define the pockets. The folder may also be assembled with one or more inserts, which may also be formed from a blank of foldable material, to increase the disk capacity of the folder assembly. The insert includes additional disk pockets. The pocket arrangement of the insert is also formed between two overlaying panels which are joined together in selected regions to define the pockets.

These and other features and advantages of the present invention will become apparent from a reading of the detailed description in conjunction with the attached drawings.

DETAILED DESCRIPTION OF THE PREFERRED EMBODIMENT

A folder according to the invention can be constructed from a variety of materials and can include a combination of materials. For example, such a folder may be constructed of individual sections of paperboard hingedly joined together and covered in cloth or plastic covering material. Pockets for holding media and included in the folder construction can be formed by cloth or plastic material bonded or adhered at appropriate locations to the hingedly joined sections. Then too, a variety of foldable materials can be used to form a folder according to the invention. Solid bleached sulfate chipboard, with a thickness of approximately 0.018 inches, is the preferred foldable material. However, machine clay coated white back, gloss laminated solid sulfate, and the like are also suitable, as are various thicknesses of these and other materials. Construction materials suitable for such a folder are also suitable for an insert in accordance with the invention. Accordingly, disclosure of the invention constructed from a blank of paperboard is illustrative.

Figure 1:
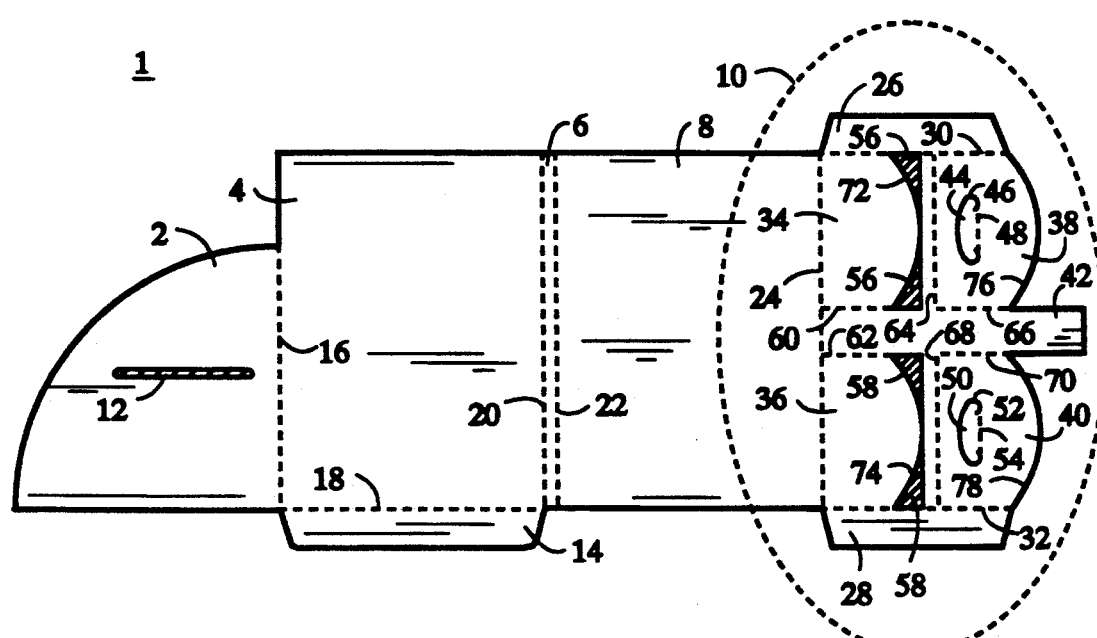
FIG. 1 is a plan view of an unfolded blank of foldable material from which a folder according to the present invention is formed.
Figure 2:
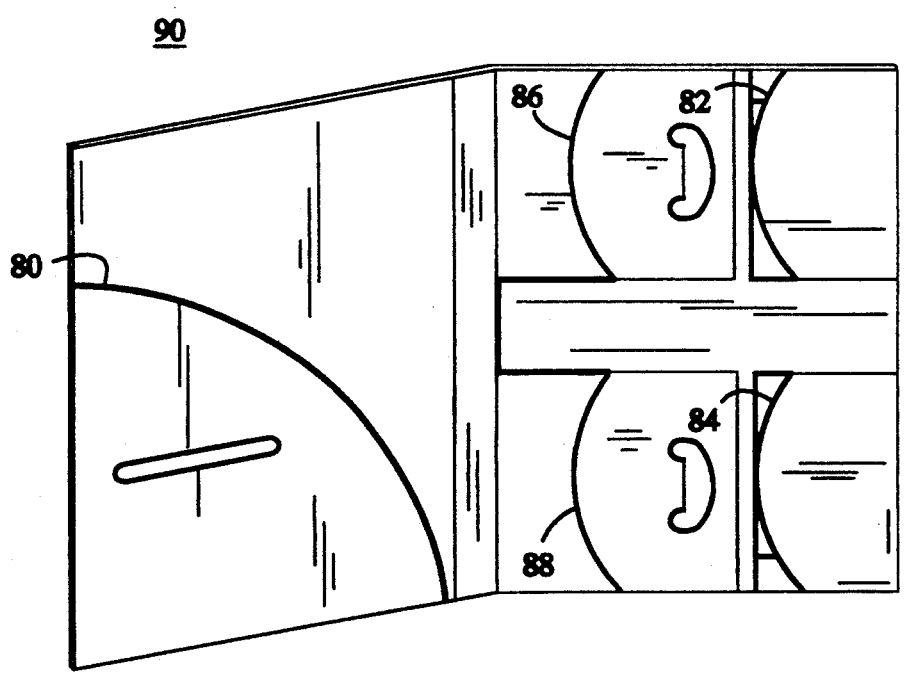
FIG. 2 is an isometric diagram of a folder formed from the blank of FIG. 1.

FIG. 1 shows an unfolded blank 1 of foldable paperboard shaped and scored to be folded and bonded together to form a folder 90 as shown in FIG. 2. The blank 1 can be either plain or preprinted. In lieu of, or in addition to, preprinting, other suitable techniques of expressing words or images on the surfaces of the blank 1 may be used. These techniques include embossing, stamping, labeling, and the like.

Gluing is the preferred method of bonding the folded blank. Solvent based glue, water soluble glue, hot melt glue, or the like are suitable. Adhesive taping and other methods may also be used. Heat sealing techniques are also appropriate if the folder is formed from plastic materials.

As shown, the blank 1 is comprised of five sections. Each section is separated from adjacent sections by a score line, such as a fold line, a flex line, or a hinge line. Referring to FIG. 1, from left to right, the five sections are identified as a pocket panel 2, a first panel 4, a spine 6, a second panel 8, and a disk panel 10. The pocket panel 2 includes a slot 12, and the first panel 4 includes a pocket flap 14. A first pocket fold line 16 separates the pocket panel 2 from the first panel 4, and a second pocket fold line 18 separates the pocket flap 14 from the first panel 4. First and second hinge lines 20, 22 separate the spine 6 from the first and second panels 4, 8 respectively. Finally, a disk fold line 24 separates the second panel 8 from the disk panel 10.

As shown in FIG. 1, the disk panel 10 includes a first disk flap 26 and a second disk flap 28. The first and second disk flaps 26, 28 are separated from the remainder of the disk panel 10 by first and second flap fold lines 30, 32 respectively. In addition, the disk panel 10 includes four disk retainers 34, 36, 38, 40 positioned in two rows of two, and a bonding region 42. Locking tabs 44, 50, each formed by a cut 46, 52 and a flex line 48, 54, may also be included for some or for all of the disk retainers. In FIG. 1, two disk retainers 38, 40 include locking tabs 44, 50. These two disk retainers 38, 40 are also referred to as inner disk retainers because of their position adjacent to the spine 8 after assembly of the blank 1.

Fold lines 24, 30, 32 separate the bonding region from the second panel 8 and from the disk flaps 26, 28. Flex lines 60, 62, 64, 66, 68, 70 separate the bonding region from the disk retainers 34, 36, 38, 40. The bonding region 42 in FIG. 1 is further separated from two disk retainers 34, 36 by first and second cutout patterns 56, 58 respectively in the blank 1. Each disk retainer 34, 36, 38, 40 includes one edge, the first edge 72, second edge 74, third edge 76, and fourth edge 78 respectively. The first and second edges 72, 74 are formed by two cut lines bordering the first and second cutout patterns 56, 58 respectively.

Referring to FIGS. 1 and 2, the pocket 80 is formed by folding and bonding portions of the blank 1. First, the pocket flap 14 is folded inwardly along its fold line 18 into an overlaying relationship with the major surface of the first panel 4. Next, the pocket panel 2 is folded inwardly along its fold line 16, toward the first panel 4 and pocket flap 14, such that the pocket panel 2 overlays the pocket flap 14. The pocket panel 2 and the pocket flap 14 are secured in their inwardly folded positions by suitable bonding, completing the formation of the pocket 80, with the opening of the pocket 80 generally facing toward the spine 6. Bonding may be accomplished by gluing, taping, laminating, or the like.

The disk pockets 82, 84, 86, 88 are formed by folding and bonding the blank 1 in a manner similar to the formation of the pocket 80. The disk flaps 26, 28 are first folded inwardly along their respective fold lines 30, 32 into an overlaying relationship with the major surface of the disk panel 10. The disk panel 10 is then folded inwardly, along the disk fold line 24, toward the second panel 8, such that the disk flaps 26, 28 overlay the major surface of the second panel 8, and the disk panel 10 overlays the disk flaps 26, 28. Finally, the second panel 8 is bonded to the disk flaps 26, 28 and to the bonding region 42 of the disk panel 10. The disk pockets 82, 84, 86, 88 are thus formed between the major surfaces of the second panel 8 and the disk panel 10, which are joined together along the bonding region 42 and along the disk flaps 26, 28 to define the disk pockets 82, 84, 86, 88. The bonding may be accomplished by gluing, taping, laminating, or the like.

As shown in FIG. 2, the folder 90 includes four disk pockets 82, 84, 86, 88. However, the number of disk pockets may be varied. If smaller diameter disks are to be held, correspondingly smaller disk pockets are required. This reduction in disk pocket size may allow an increased number of disk pockets to be formed by a disk panel. Alternatively, larger disks may be held by forming fewer, but larger, disk pockets.

Figure 3:
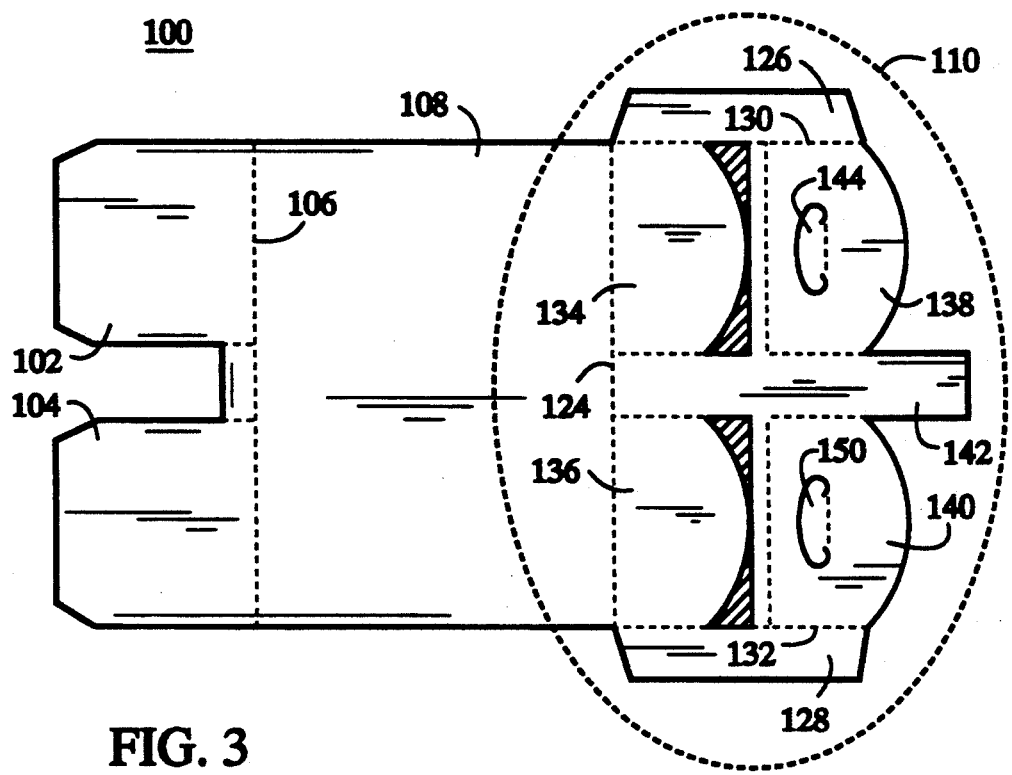
FIG. 3 is a plan view of an unfolded blank of foldable material from which an insert according to the present invention is formed.
Figure 4:
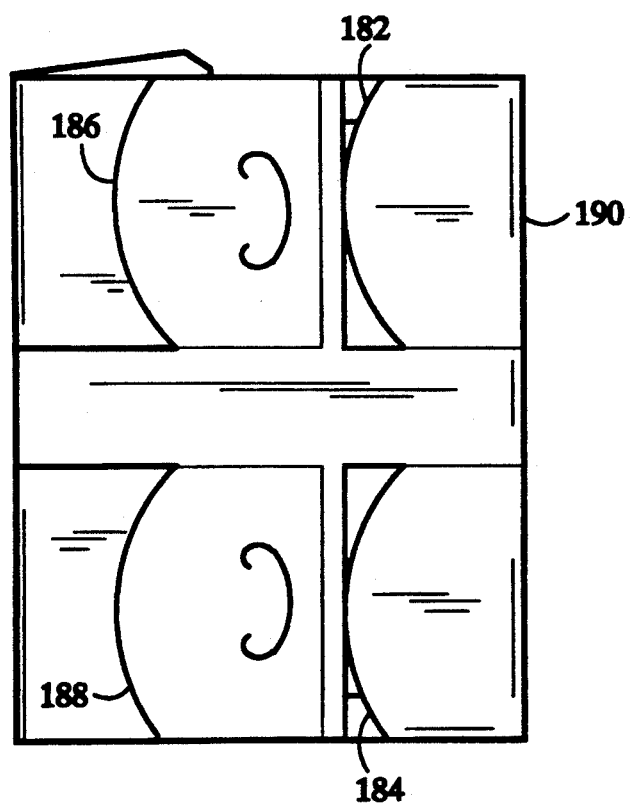
FIG. 4 is an isometric diagram of an insert formed from the blank of FIG. 3.

FIG. 3 shows an infolded insert blank 100 of paperboard shaped and scored to be folded and bonded together to form the insert 190 shown in FIG. 4. The insert blank 100 can be either plain or preprinted. In lieu of, or in addition to, preprinting, other suitable techniques of expressing words or images on the surfaces of the insert blank 100 may be used. These techniques include embossing, stamping, labeling, and the like.

The insert blank 100 shown in FIG. 3 is comprised of three sections. Each section is separated from adjacent sections by a score line, such as a fold line or a hinge line. Beginning at the left side of FIG. 3, two insert tabs 102, 104 are separated from an insert panel 108 by a hinge line 106. The insert panel 108 is in turn separated from an insert disk panel 110 by an insert fold line 124.

The insert disk panel 110 includes first and second insert flaps 126, 128. An insert disk panel also includes one or more insert disk retainers and may include one or more insert locking tabs. As shown in FIG. 3, the insert disk panel 110 includes four insert disk retainers 134, 136, 138, 140, two insert locking tabs 144, 150, and an insert bonding region 142. The insert disk panel 110 is identical to the disk panel 10 of the folder 90, shown in FIG. 1. However, the configuration of an insert disk panel can differ from the configuration of a folder.

The insert disk panel 110 of FIG. 3 includes four insert disk retainers 134, 136, 138, 140, one for each disk to be held. However, the number of insert disk retainers may be varied. If smaller diameter disks are to be held, correspondingly smaller insert disk retainers are required. This reduction in insert disk retainer size may allow an increased number of insert disk retainers to be formed by a disk panel. Alternatively, larger disks may be held by forming fewer, but larger, insert disk retainers. The number and size of insert disk retainers formed on an insert disk panel need not match the number and size of disk retainers formed on the disk panel of a folder.

Insert disk pockets 182, 184, 186, 188 of FIG. 4 are formed from the insert blank 100 in the same way as the disk pockets 82, 84, 86, 88 of the folder 90 are formed from the blank 1 of FIG. 1. The insert flaps 126, 128 are first folded along their respective insert flap fold lines 130, 132 into an overlaying relationship with the major surface of the insert disk panel 110. The insert disk panel 110 is then folded inwardly, along the insert fold line 124, toward the insert panel 108, such that the insert flaps 126, 128 overlay the major surface of the insert panel 108, and the insert disk panel 110 overlays the insert flaps 126, 128. Finally, the insert panel 108 is bonded to the insert flaps 126, 128, and to the insert bonding region 142 of the insert disk panel 110. The insert disk pockets 182, 184, 186, 188 are thus formed between the major surfaces of the insert panel 108 and the insert disk panel 110, which are joined together along the insert bonding region 142 and along the insert flaps 126, 128 to define the insert disk pockets 182, 184, 186, 188. The bonding may be accomplished by gluing, taping, laminating, or the like.

FIG. 4 shows the insert 190 with four insert disk pockets 182, 184, 186, 188. However, the size and the number of the insert disk pockets formed in an insert may be varied. The degree of possible variation matches the variation described for the folder of FIG. 2. The size and number of insert disk pockets chosen for an insert need not match the configuration of disk pockets chosen for a folder.

Figure 5:
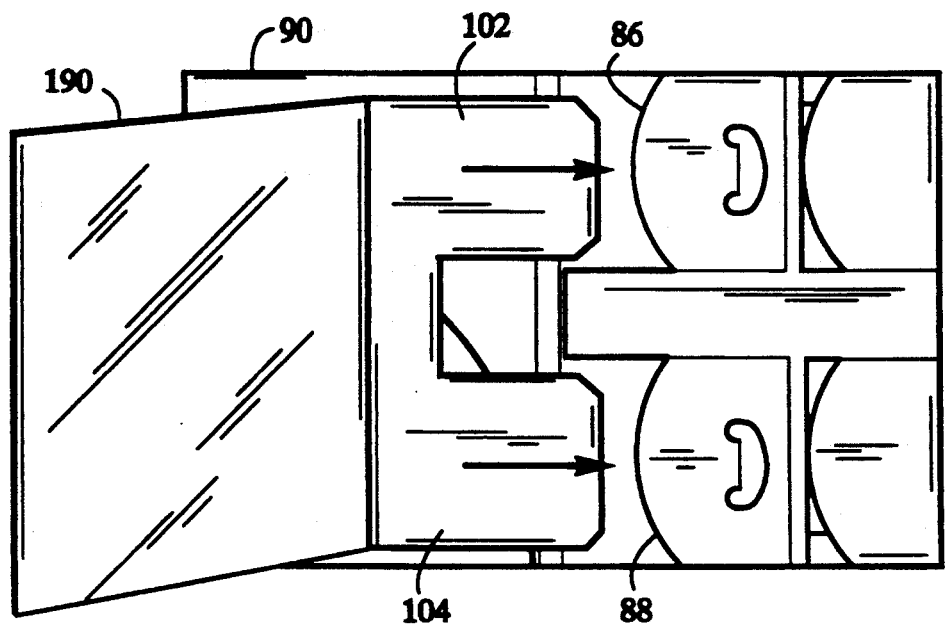
FIG. 5 is an isometric assembly diagram of the insert of FIG. 4 positioned for placement in the folder of FIG. 2, in accordance with the present invention.

FIG. 5 shows the insert 190 positioned for placement in the folder 90. The insert 190 increases the disk storage capacity of the resulting folder assembly 200 shown in FIG. 6.

As shown in FIG. 5, the insert tabs 102, 104 are used to removably secure the insert 190 of FIG. 4 to the folder 90. This is done by placing each insert tab 102, 104 in a corresponding disk pocket 86, 88 of the folder 90. The insert 190 includes two insert tabs 102, 104 whose size and relative spacing match that of the two inner disk pockets 86, 88 of the folder 90, respectively. The two inner disk pockets 86, 88 may each contain a disk in addition to the respective insert tabs 102, 104.

Figure 6:
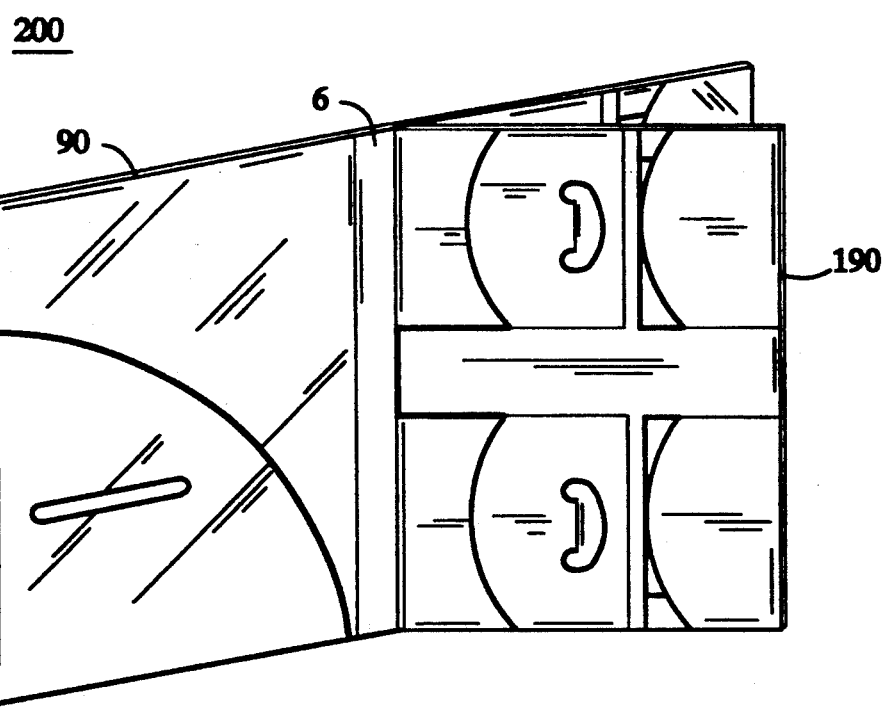
FIG. 6 is an isometric diagram of the assembled folder and insert of FIG. 5.

FIG. 6 shows the completed folder assembly 200, including the folder 90 and one insert 190. The folder assembly 200 opens and closes like a book, with the insert 190 acting as a stiff page. Additional inserts may be added to the folder assembly (see FIG. 7.) This is done in the same manner as shown in FIG. 5. However, the insert tabs of each successive insert are placed into the corresponding insert disk pockets of the previously assembled insert. This requires that the size and relative spacing of the insert tabs of the successive inserts match the respective insert disk pockets of the previously assembled insert.

To accommodate the thickness of multiple inserts, the width of the spine 6 may be increased. Alternatively, the spine 6 may include a series of parallel scores, running the length of the spine 6. Much like a standard office file folder, a spine including parallel scores may accommodate a variety of thicknesses. The width of the spine may then be chosen based on the thickness of the documentation to be held, as well as on the number of inserts and disks to be held.

Figure 7:
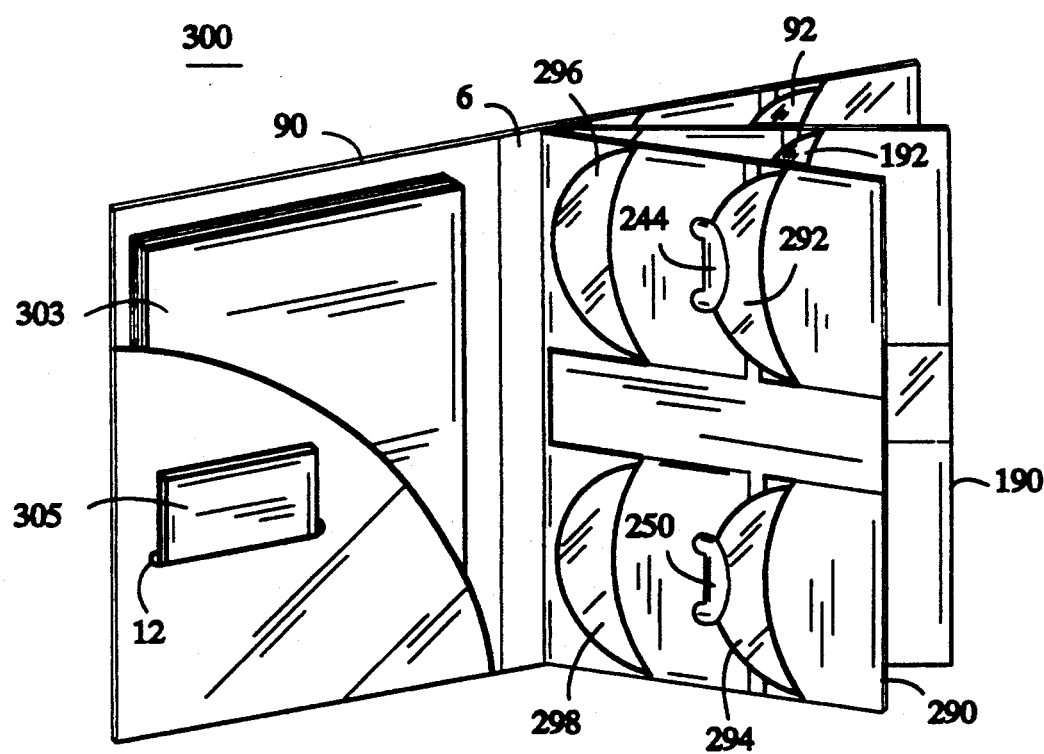
FIG. 7 is an isometric diagram of a folder assembly containing two inserts, with the folder assembly holding documentation, disks, and other materials.

FIG. 7 shows a folder assembly 300 that includes two inserts 190, 290. This folder assembly 300 is shown with its contents in place. The contents of this folder assembly 300 may include up to twelve disks and documentation. Additional material may also be held in the slot 12. This additional material may include adhesive labels to be applied to the spine 6 for identification of the folder assembly 300, and other items. Six disks 92, 192, 292, 294, 296, 298, documentation 303, and additional material 305 are shown in the folder assembly 300 in FIG. 7.

Disks located farthest from the spine are secured by locking tabs. This prevents these disks from becoming dislodged during shipment. Two disks 292, 294 are shown to be secured by locking tabs 244, 250 in FIG. 7. Disks located nearest to the spine do not require locking tabs. When the folder assembly is folded closed for shipment, the spine traps these disks in their respective disk pockets, preventing the disks from becoming dislodged. Two disks 296, 298 are shown to be so trapped by the spine 6 in FIG. 7.

When compact discs are to be held in a folder or in an insert, additional protection of the compact disc surface may be desired. To minimize abrasion and contamination of the compact disk surface, it is preferred that the compact disc be placed in a protective envelope having a smooth surface finish. Such an envelope may be made from low density polyethylene or coated paper. The envelope, containing the compact disc, is then inserted into a disk pocket of a folder or into an insert disk pocket of an insert. Alternatively, the surface of the blanks, from which the folder and insert are formed, may be coated with plastic. Instead of using a plastic coating, varnish may be applied to the blanks using a printing process.

The folder assembly 300 of FIG. 7 is shown holding compact discs. The invention is also suited to holding other types of disks, such as floppy disks of various sizes.

Figure 8:
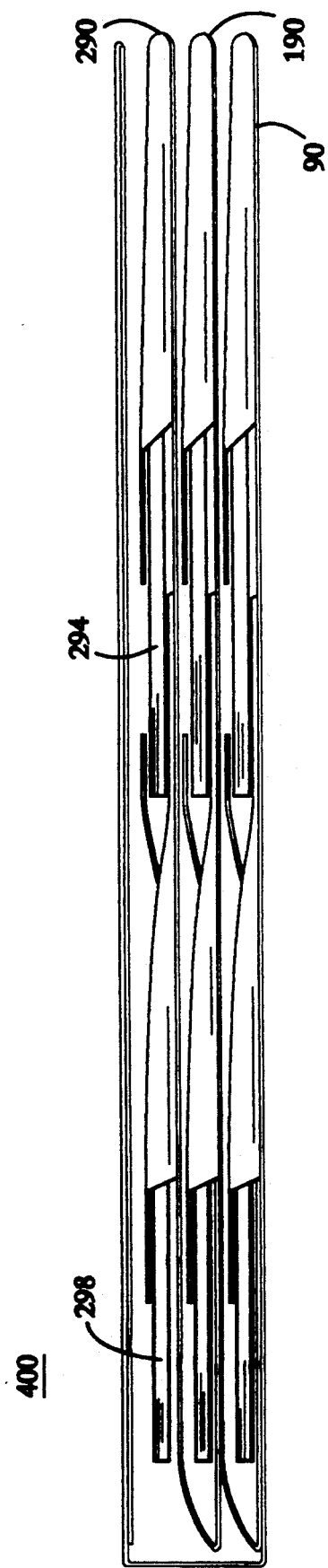
FIG. 8 is a bottom view of the closed folder assembly of FIG. 7 without the documentation.

FIG. 8 is a bottom view of a folder assembly 400 including a folder 90 and two inserts 190, 290. The folder assembly is shown holding disks. The back insert 190 is secured to the folder 90 by locating the insert tabs of the back insert 190 into the corresponding disk pockets of the folder 90. The front insert 290 is then secured to the back insert 190. This is done by locating the insert tabs of the front insert 290 into the corresponding disk pockets of the back insert 290.

What is claimed is:

1. A folder for holding disks comprising:
   a first panel,
   a spine, hingedly joined to the first panel,
   a second panel, hingedly joined to the spine, the hingedly joined spine being positioned between the first and second panels and allowing opening and closing of the folder,
   a disk panel positioned in overlaying relationship with the inner surface of the second panel, the perimeter region of the disk panel exclusive of the region facing the spine being bonded to the second panel, the perimeter region of the disk panel facing the spine being left unbonded, the disk panel further being bonded to the second panel along a first bonding strip extending from the unbonded perimeter region of the disk panel facing the spine in a direction away from the spine and along a second bonding strip extending across the disk panel in crossing relationship with the first bonding strip, the disk panel having a first cut line being immediately adjacent to the second bonding strip such that the second bonding strip is positioned between the first cut line and the spine, the first cut line extending between the first bonding strip and the bonded perimeter region of the disk panel, the disk panel having a second cut line being immediately adjacent to the second bonding strip, the second bonding strip being positioned between the second cut line and the spine, the second cut line extending between the first bonding strip and the bonded perimeter region of the disk panel, the first bonding strip being positioned between the first and the second cut lines, the cut lines, the unbonded perimeter regions of the disk panel, the bonded perimeter regions of the disk panel, and the bonded bonding strips being oriented to form four disk pockets between the second panel and the disk panel, the disk pockets being positioned in two rows of two for holding disks.

2. The folder of claim 1, further comprising a pocket panel, the pocket panel being positioned in overlaying relationship with the inner surface of the first panel, the pocket panel being bonded to the first panel along the perimeter region of two adjacent sides of the pocket panel, wherein one of the adjacent sides of the pocket panel is located in opposition to the spine, the remainder of the pocket panel being unbonded, the pocket panel, the first panel, the bonded and unbonded portions of the pocket panel forming a pocket between the first panel and the pocket panel.

3. The folder of claim 1, further comprising a removable insert, the insert including an insert panel, the insert further including two insert tabs, the insert tabs being hingedly joined to the insert panel along a hinge line, the insert further including an insert disk panel positioned in overlaying relationship with one of the major surfaces of the insert panel, the perimeter region of the insert disk panel exclusive of the region facing the hinge line being bonded to the insert panel, the perimeter region of the insert disk panel facing the hinge line being left unbonded, the insert disk panel further being bonded to the insert panel along a first insert bonding strip extending from the unbonded perimeter region of the insert disk panel facing the hinge line in a direction away from the hinge line and along a second insert bonding strip extending across the insert disk panel in crossing relationship with the first insert bonding strip, the insert disk panel having a first insert cut line being immediately adjacent to the second insert bonding strip such that the second insert bonding strip is positioned between the first insert cut line and the hinge line, the first insert cut line extending between the first insert bonding strip and the bonded perimeter region of the insert disk panel, the insert disk panel having a second insert cut line being immediately adjacent to the second insert bonding strip, the second insert bonding strip being positioned between the second insert cut line and the hinge line, the second insert cut line extending between the first insert bonding strip and the bonded perimeter region of the insert disk panel, the first insert bonding strip being positioned between the first and the second insert cut lines, the insert cut lines, the unbonded perimeter regions of the insert disk panel, the bonded perimeter regions of the insert disk panel, and the bonded insert bonding strips being oriented to form four insert disk pockets between the insert panel and the insert disk panel, the insert disk pockets being positioned in two rows of two for holding disks, and each of the insert tabs being located in one of the disk pockets formed between the second panel and the disk panel, the positioning of the insert tabs in such disk pockets removably securing the insert in the folder.

4. A folder for holding disks comprising:
   a blank of foldable material having
   a spine defined by a first hinge line and a second hinge line in the blank, the hinge lines being spaced apart and generally parallel and extending between opposing sides of the blank,
   the blank further having a first folder portion separated from the spine by the first hinge line,
   the blank further having a second folder portion separated from the spine by the second hinge line, the spine being positioned between the first and second folder portions, the second folder portion having a disk fold line extending between opposing sides of the blank and being generally parallel to the hinge lines, the disk fold line dividing the second folder portion into a second panel and a disk panel,
   the disk panel having first and second flap fold lines, the flap fold lines being spaced-apart and extending across opposing edge regions in a direction generally perpendicular to the hinge lines, the first and second flap fold lines defining first and second disk flaps respectively,
   the disk panel further comprising a first disk retainer, a second disk retainer, and a bonding region being positioned between the first and second disk retainers and extending across the disk panel in a direction generally perpendicular to the hinge lines, the first disk retainer defined by the disk fold line, the first flap fold line, a first edge of the disk panel located in opposition to the disk fold line, and a flex line extending in a direction generally perpendicular to the hinge lines and separating the first disk retainer from the bonding region, the second disk retainer defined by the disk fold line, the second flap fold line, a second edge of the disk panel located in opposition to the disk fold line, and a flex line extending in a direction generally perpendicular to the hinge lines and separating the second disk retainer from the bonding region, the disk flaps being folded inwardly, the disk panel being folded inwardly in overlaying relationship with the disk flaps and the second panel, and the second panel being bonded to the disk flaps and the bonding region by bonding means to form disk pockets for holding disks.

5. The folder of claim 4 wherein the blank of foldable material comprises paperboard.

6. The folder of claim 4, the first and second edges of the disk panel being arcuately shaped, the first and second edges of the disk panel being convex.

7. The folder of claim 4 wherein the disk panel further comprises a first inner disk retainer and a second inner disk retainer, the disk first and second disk retainers and the first and second inner disk retainers being positioned in two rows of two, the bonding region further extending between the flap fold lines in a direction generally parallel to the hinge lines, the bonding region separating one row of disk retainers from the other row of disk retainers, the first inner disk retainer being formed by the first flap fold line, a third edge of the disk panel, and two adjacent flex lines separating the first inner disk retainer from the bonding region, the second inner disk retainer being defined by the second flap fold line, a fourth edge of the disk panel, and two adjacent flex lines separating the second inner disk retainer from the bonding region, the disk panel further comprising a first cutout and a second cutout, the first cutout being defined by the first edge of the disk panel, the first flap fold line, and the bonding region, the second cutout being defined by the second edge of the disk panel, the second flap fold line, and the bonding region.

8. The folder of claim 4, wherein the first folder portion further includes a first pocket fold line, spaced from and generally parallel to the hinge lines, dividing the first folder portion into a first panel and a pocket panel, the first panel being situated between the pocket panel and the spine and having a second pocket fold line extending between the pocket panel and the spine in a direction generally perpendicular to the hinge lines to define a pocket flap, the pocket flap being folded inwardly and the pocket panel being folded inwardly in overlaying relationship with the pocket flap and the first panel to form a storage pocket, the pocket flap being bonded to the first panel by the bonding means.

9. The folder of claim 8, wherein the perimeter of the pocket panel, exclusive of the pocket panel region adjacent to the first pocket fold line and exclusive of the pocket panel region in opposition to the pocket flap, is arcuately shaped, the arcuately shaped portion of the pocket panel perimeter being convex.

10. The folder of claim 8 wherein the disk panel further comprises a first inner disk retainer and a second inner disk retainer, the first and second disk retainers and the first and second inner disk retainers being positioned in two rows of two, the bonding region further extending between the flap fold lines in a direction generally parallel to the hinge lines, the bonding region separating one row of disk retainers from the other row of disk retainers, the first inner disk retainer being formed by the first flap fold line, a third edge of the disk panel, and two adjacent flex lines separating the first inner disk retainer from the bonding region, the second inner disk retainer being defined by the second flap fold line, a fourth edge of the disk panel, and two adjacent flex lines separating the second inner disk retainer from the bonding region, the disk panel further comprising a first cutout and a second cutout, the first cutout being defined by the first edge of the disk panel, the first flap fold line, and the bonding region, the second cutout being defined by the second edge of the disk panel, the second flap fold line, and the bonding region.

11. The folder of claim 10, the first, second, third, and fourth edges of the disk panel being arcuately shaped, the first, second, third, and fourth edges of the disk panel being convex.

12. The folder of claim 10, each of the first and second inner disk retainers including a locking tab, each locking tab being defined by a flex line generally parallel to the hinge lines and by a curved cut line extending between the two ends of the flex line and being oriented between the flex line and the disk fold line, the locking tabs being generally centered in the inner disk retainers, the locking tabs being positioned such that the distance from the center of the locking tabs to the disk fold line is approximately equal to the diameter of the disks to be held by the outer disk retainers.

13. The folder of claim 10 wherein the folder further comprises an insert, the insert comprising two insert tabs and an insert panel, the insert tabs being hingedly joined to the insert panel along an insert hinge line, each of the insert tabs being located in a corresponding the inner disk retainer.

14. The folder of claim 13 wherein the insert is formed from a blank of foldable material, the insert further comprising an insert disk panel separated from the insert panel by an insert fold line extending across the blank in a direction generally parallel to the insert hinge line, the insert disk panel having first and second insert flap fold lines, the insert flap fold lines being spaced-apart and extending across opposing edge regions in a direction generally perpendicular to the insert hinge line, the first and second flap fold lines defining first and second insert flaps respectively, the insert disk panel further comprising a first insert disk retainer, a second insert disk retainer, and an insert bonding region being positioned between the first and second insert disk retainers and extending across the insert disk panel in a direction generally perpendicular to the insert hinge line, the first insert disk retainer defined by the insert fold line, the first insert flap fold line, a first edge of the insert disk panel located in opposition to the insert fold line, and a flex line extending in a direction generally perpendicular to the hinge lines and separating the first insert disk retainer from the insert bonding region, the second insert disk retainer defined by the insert fold line, the second insert flap fold line, a second edge of the insert disk panel located in opposition to the insert fold line, and a flex line extending in a direction generally perpendicular to the hinge lines and separating the second insert disk retainer from the insert bonding region, the insert flaps being folded inwardly, the insert disk panel being folded inwardly in overlaying relationship with the insert flaps and the insert panel, and the insert panel being bonded to the insert flaps and the insert bonding region by the bonding means to form insert disk pockets for holding disks.

15. The folder of claim 14 wherein the blank of foldable material forming the insert comprises paperboard.

16. The folder of claim 14 wherein the insert disk panel further comprises a first inner insert disk retainer and a second inner insert disk retainer, the first and second insert disk retainers and the first and second inner disk retainers being positioned in two rows of two, the insert bonding region further extending between the insert flap fold lines in a direction generally parallel to the insert hinge line, the insert bonding region separating one row of insert disk retainer from the other row of insert disk retainers, the first inner insert disk retainer being formed by the first insert flap fold line, a third edge of the insert disk panel, and two adjacent flex lines separating the first inner insert disk retainer from the insert bonding region, the second inner insert disk retainer being defined by the second insert flap fold line, a fourth edge of the insert disk panel, and two adjacent flex lines separating the second inner insert disk retainer from the insert bonding region, the insert disk panel further comprising a first and second insert cutout, the first insert cutout being defined by the first edge of the insert disk panel, the first insert flap fold line, and the insert bonding region, the second cutout being defined by the second edge of the insert disk panel, the second insert flap fold line, and the insert bonding region.

17. The folder of claim 16 wherein the pocket panel includes a cutout forming a slot, the slot being oriented generally perpendicular to the hinge lines.

18. The folder of claim 16, each of the first and second inner insert disk retainers including a locking tab, each locking tab being defined by a flex line generally parallel to the insert hinge line and by a curved cut line extending between the two ends of the flex line and being oriented between the flex line and the insert fold line, the locking tabs being generally centered in the inner insert disk retainers, the locking tabs being positioned such that the distance from the center of the locking tabs to the insert fold line is approximately equal to the diameter of the disks to be held by the outer insert disk retainers.

* * * * *